(12) United States Patent
Shibata

(10) Patent No.: US 7,378,140 B2
(45) Date of Patent: May 27, 2008

(54) OPTICAL INFORMATION RECORDING METHOD

(75) Inventor: Michihiro Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 232 days.

(21) Appl. No.: 10/857,503

(22) Filed: Jun. 1, 2004

(65) Prior Publication Data
US 2004/0247818 A1 Dec. 9, 2004

(30) Foreign Application Priority Data
Jun. 3, 2003 (JP) ............................ 2003-157781

(51) Int. Cl.
*B32B 3/04* (2006.01)

(52) U.S. Cl. ................. 428/64.4; 430/270.11
(58) Field of Classification Search ................. 428/64.8
See application file for complete search history.

(56) References Cited

U.S. PATENT DOCUMENTS

| | | |
|---|---|---|
| 5,952,073 A | 9/1999 | Hurditch et al. |
| 6,226,255 B1 * | 5/2001 | Suzuki et al. ............ 369/275.1 |
| 6,232,036 B1 | 5/2001 | Suzuki et al. |
| 6,541,092 B2 * | 4/2003 | Shibata et al. ............. 428/64.1 |
| 6,770,347 B2 * | 8/2004 | Morishima ................. 428/64.1 |
| 7,144,677 B2 | 12/2006 | Yashiro |
| 2003/0161987 A1 | 8/2003 | Nakajima et al. |

FOREIGN PATENT DOCUMENTS

| | | |
|---|---|---|
| JP | 10-291366 | 11/1998 |
| JP | 2002-140836 A | 5/2002 |
| JP | 2002-279637 A | 9/2002 |

OTHER PUBLICATIONS

European Search Report.

* cited by examiner

*Primary Examiner*—Bruce H. Hess
(74) *Attorney, Agent, or Firm*—Sughrue Mion, PLLC

(57) ABSTRACT

An optical information recording method including recording information at a linear velocity of at least 14 m/s to an optical information recording medium including a substrate and a dye-containing recording layer formed on the substrate. The dye has an endothermic peak when subjected to differential thermal analysis under a flow of nitrogen gas.

21 Claims, No Drawings

OPTICAL INFORMATION RECORDING METHOD

CROSS-REFERENCE TO RELATED APPLICATION

This application claims priority under 35USC 119 from Japanese Patent Application No. 2003-157781, the disclosure of which is incorporated by reference herein.

BACKGROUND OF THE INVENTION

1. Field of the Invention

The present invention relates to a method for optically recording information to an optical information recording medium and particularly to a method for optically recording information at a linear velocity of at least 14 m/s.

2. Description of the Related Art

One conventionally known optical information recording medium is an optical disk on which information can be recorded with a laser beam only one time. Such an optical disk is also called a write-once CD (so called CD-R), whose typical structure includes a recording layer of organic dye, a light reflecting layer of metal such as gold, and a protective resin layer stacked in this order formed on a transparent substrate disk. When information is recorded, a near-infrared laser beam (generally with a wavelength of about 780 nm) is applied to such CD-Rs, an irradiated portion of the recording layer absorbs the beam and thus is locally heated and optical characteristics of the irradiated portion change physically or chemically (for example, pits are formed). When the information is read (played back), a laser beam having the same wavelength as that used for recording irradiates the optical disk to detect a difference in reflectivity between a position of the recording layer with the changed optical characteristics (recorded portion) and a position of the recording layer with unchanged optical characteristics (unrecorded portion).

In recent years, there has been a demand for a higher density optical information recording medium. In response to such a demand, a proposal is an optical disk called "write-once Digital Versatile Disk" (so called DVD-R). The structure of such DVD-Rs includes: a transparent substrate disk having a guide groove (pre-groove) (0.74 to 0.8 µm) to be tracked by an irradiated laser beam (such a pre-groove is at least twice as more narrow as that of CD-R); a recording layer that includes a dye and is formed on the substrate; a light reflecting layer generally formed on the recording layer; and optionally a protective layer, wherein two disks each having the aforementioned layers or the disk having the aforementioned layers and a protective substrate disk with the same shape are bonded with an adhesive in such a manner that the recording layer is placed inside. Recording and playback are performed by irradiating a visible laser beam (generally with a wavelength in the range of from 630 nm to 680 nm) to the DVD-R. The recording density of DVD-R can be made higher than that of CD-R.

With respect to such DVD-Rs, recently, there has been a growing demand for a high recording speed of 4× or more (a linear velocity of at least 14 m/s). It is known that optimal recording power for an optical information recording medium is approximately proportional to the square root of recording speed. For example, the optimal recording power at a recording speed of 4× is about twice as high as that at 1×. As the recording speed increases, the energy applied for a short time increases, and thus the deformation of the recorded pit portion tends to increase. A greater deformation of the recorded pit can produce a higher degree of modulation so that the playback signal C/N can be higher. In such cases, however, the signal leak to adjacent tracks increases, in other words, the crosstalk increases. A higher recording density means a shorter track pit and thus crosstalk has a large effect.

When pre-pits having address signals are formed on the land area between the recording tracks like in DVD-Rs, if relatively large pits are formed on the recording track, the address information can become hard to read causing LPP errors to occur.

For example, Japanese Patent Application Laid-Open (JP-A) No. 10-188341 discloses an optical information recording medium in which a recording layer containing an organic dye as a main component has an exothermic peak of from −10 µV/mg to 10 µV/mg for the purpose of solving the problem of crosstalk. In such an optical information recording medium, however, in high speed recording, for example, at a linear velocity of at least 14 m/s, formed pits are too large, which can have an adverse effect on the readout from adjacent tracks or the readout of the address information from the land portion.

SUMMARY OF THE INVENTION

The present invention has been made in light of the above-mentioned problem. It is therefore an object of the invention to provide an optical information recording method by which LPP error rate can be kept low even when information is recorded at a linear velocity of at least 14 m/s.

A first aspect of the invention is to provide an optical information recording method, which includes recording information at a linear velocity of at least 14 m/s to an optical information recording medium including a substrate and a dye-containing recording layer formed on the substrate. The dye has an endothermic peak when subjected to differential thermal analysis under a flow of nitrogen gas.

The endothermic peak of the dye may be 10 µVs/mg or more.

The dye may also have an exothermic peak, and in such a dye, a total amount of endothermic heat is preferably larger than a total amount of exothermic heat.

The optical information recording medium may have a track pitch of 0.8 µm or less and a minimum pit length of pits formed by recording may be 0.5 µm or less.

A second aspect of the invention is to provide an optical information recording medium including a substrate and a dye-containing recording layer formed on the substrate. The dye has an endothermic peak when subjected to differential thermal analysis under a flow of nitrogen gas, and the optical information recording medium is for being recorded with information at a linear velocity of at least 14 m/s.

DETAILED DESCRIPTION OF THE INVENTION

According to the present invention, the optical information recording method includes recording information at a linear velocity of at least 14 m/s to an optical information recording medium that includes a substrate and a dye-containing recording layer formed on the substrate. The dye has an endothermic peak when subjected to differential thermal analysis under a flow of nitrogen gas. In this method, the formation of excessively large pits can be prevented even when information is recorded at a high linear velocity of at least 14 m/s, and thus LPP error rate can be reduced, because the dye in the recording layer of the optical information recording medium has an endothermic peak.

First, a description is provided of the optical information recording medium used in the optical information recording method of the invention.

Optical Information Recording Medium

The optical information recording medium used in the method of the invention is a writable medium including a write-once optical information recording medium such as DVD-R.

For example, the optical information recording medium such as DVD-R includes two substrates (first and second substrates) bonded-together, wherein a recording layer is formed at least on the first substrate, and preferably, any other layer such as a reflective layer and a protective layer is formed on the first substrate, if necessary. Another recording layer and preferably any other layer such as a reflective layer may also be formed on the second substrate. Alternatively, the second substrate may be a protective substrate (a dummy substrate) on which no layer is formed.

With respect to a typical example of the optical information recording medium such as DVD-R, a description is provided below of the substrate and each layer of the optical information recording medium according to the invention. It will be understood that the structure of each layer, materials and the like are shown by way of illustration only and not as the limitations of the invention.

[Substrate]

The substrate may be made of any material selected from various types of substrate materials used for the conventional optical information recording media.

Examples of such a material include glass, polycarbonate, acrylic resin such as poly(methyl methacrylate), vinyl chloride resin such as poly(vinyl chloride) and a copolymer of vinyl chloride, epoxy resin, amorphous polyolefin, polyester, and metal such as aluminum. If desired, any combination thereof may also be used.

The material is preferably polycarbonate or amorphous polyolefin, particularly preferably polycarbonate, from the viewpoint of humidity resistance, dimensional stability, low cost, and the like. The substrate preferably has a thickness of 0.5 to 1.4 mm.

The substrate may have a guide groove for tracking or irregularities (pre-groove) for representing address signals or the like. The track pitch of the pre-groove is preferably from 0.35 to 0.9 μm, more preferably from 0.45 to 0.85 μm, and still more preferably from 0.5 to 0.8 μm. The pre-groove has a depth (groove depth) preferably of 80 to 180 nm, more preferably of 100 to 170 nm, and still more preferably of 110 to 160 nm. The pre-groove preferably has a half width of 200 to 400 nm, more preferably of 230 to 380 nm, and still more preferably of 250 to 350 nm.

Because the dye in the recording layer of the optical information recording medium according to the invention has an endothermic peak, smaller pits can be formed on the recording layer, and thus the track pitch and the minimum pit length can be set smaller. In the optical information recording medium used in the method for optically recording information, therefore, the track pitch is preferably 0.8 μm or less, and the minimum pit length is preferably 0.5 μm or less with respect to the pits formed by recording. The track pitch is more preferably 0.80 μm or less, and still more preferably 0.75 μm or less. The minimum pit length is more preferably 0.50 μm or less, and still more preferably 0.45 μm or less.

For the purpose of improving flatness and adhesiveness and preventing deterioration of the recording layer, an undercoat layer may be provided on the substrate surface on which the recording layer will be formed. Examples of the material for the undercoat layer include polymer materials such as poly(methyl methacrylate), acrylic acid-methacrylic acid copolymers, styrene-maleic anhydride copolymers, polyvinyl alcohol, N-methylol acrylamide, styrene-vinyl toluene copolymers, chlorosulfonated polyethylene, nitrocellulose, poly(vinyl chloride), chlorinated polyolefin, polyester, polyimide, vinyl acetate-vinyl chloride copolymers, ethylene-vinyl acetate copolymers, polyethylene, polypropylene, and polycarbonate; and surface modifying agents such as silane coupling agents. The undercoat layer may be formed by a process of preparing a coating liquid by dissolving or dispersing any of the above materials in an appropriate solvent and then applying the coating liquid to the substrate surface by a coating method such as spin coating, dip coating, and extrusion coating. The undercoat layer has a thickness preferably of 0.005 to 20 μm, and more preferably of 0.01 to 10 μm.

[Recording Layer]

In the invention, the dye contained in the recording layer has an endothermic peak when subjected to differential thermal analysis under a flow of nitrogen gas.

The endothermic peak of the dye preferably has an intensity of 10 μVs/mg or more, more preferably of 20 μVs/mg or more, and still more preferably of 30 μVs/mg or more. An upper limit to the endothermic peak is preferably 100 μVs/mg. The dye having an endothermic peak intensity of 10 μVs/mg or more can preferably prevent formation of too large pits and thus preferably reduce the signal leak to adjacent tracks or the land pre-pit signal.

As described above, the dye used in the invention has an endothermic peak. Such a dye may also have an exothermic peak. In such a case, the total amount of endothermic heat should be larger than the total amount of exothermic heat with respect to the dye used.

The dye having the endothermic peak may be used alone or may be used in combination with any other dye having no endothermic peak as long as the effect of the invention is not ruined. In such a combination, the content of the dye with no endothermic peak is preferably from 5 to 50%, and more preferably from 10 to 40%.

Examples of the dye applicable to the invention include cyanine dyes, phthalocyanine dyes, imidazoquinoxaline dyes, pyrylium or thiopyrylium dyes, azulenium dyes, squarylium dyes, metal (such as Ni and Cr)-complex dyes, naphthoquinone dyes, anthraquinone dyes, indophenol dyes, indoaniline dyes, triphenylmethane dyes, merocyanine dyes, oxonol dyes, aminium or diimmonium dyes, and nitroso compounds. Preferable examples are the cyanine dyes, phthalocyanine dyes, azulenium dyes, squarylium dyes, oxonol dyes, and imidazoquinoxaline dyes.

Examples of the solvent used in the coating liquid for forming the recording layer include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cyclohexane; ethers such as tetrahydrofuran, ethyl ether and dioxane; alcohols such as ethanol, n-propanol, isopropanol, n-butanol, and diacetone alcohol; fluoride solvents such as 2,2,3,3-tetrafluoropropanol; and glycol ethers such as ethylene glycol monomethyl ether, ethylene glycol monoethyl ether, and propylene glycol monomethyl ether. Depending on the solubility of the used dye, one of these solvents may be used alone, or two or more thereof may be used in combination, if necessary. Preferable examples are the fluoride solvents such as 2,2,3,3-tetrafluoropropanol. If desired, the coating liquid may contain an anti-fading agent or a binder and may further contain any of various additives such as an antioxidant, a UV absorbing agent, a plasticizer, and a lubricant, depending on the purpose.

Typical examples of the anti-fading agent include nitroso compounds, metal complexes, diimmonium salts, and aminium salts. For example, these examples are disclosed in JP-A Nos. 02-300288, 03-224793 and 04-146189, respectively.

Examples of the binder include natural organic polymer materials such as gelatin, cellulose derivatives, dextran, rosin, and rubber; and synthetic organic polymers such as hydrocarbon resins such as polyethylene, polypropylene, polystyrene, and polyisobutylene, vinyl resins such as poly(vinyl chloride), poly(vinylidene chloride) and poly(vinyl chloride)-poly(vinyl acetate) copolymers, acrylic resins such as poly(methyl acrylate) and poly(methyl methacrylate), polyvinyl alcohol, chlorinated polyethylene, epoxy resins, butyral resins, rubber derivatives, and initial condensation products of heat-curable resins such as phenol-formaldehyde resins. The binder is used preferably in an amount of 0.2 to 20 parts by mass, more preferably in an amount of 0.5 to 10 parts by mass, and still more preferably in an amount of 1 to 5 parts by mass, based on 100 parts by mass of the dye.

One of the above solvents may be used alone, or two or more thereof may be used in combination, depending on the solubility of the dye in the solvent. The coating liquid may also contain any of various additives such as an antioxidant, a UV absorbing agent, a plasticizer, and a lubricant, depending on the purpose.

Examples of the coating method include a spraying method, a spin coating method, a dip method, a roll coating method, a blade coating method, a doctor roll method, and a screen printing method. The recording layer may have a single layer structure or a multilayer structure. The recording layer generally has a thickness in the range of from 20 to 500 nm, preferably from 30 to 300 nm, and more preferably from 50 to 100 nm.

The application is performed preferably at a temperature of 23 to 50° C. without particular problems, more preferably at a temperature of 24 to 40° C., and still more preferably at a temperature of 25 to 37° C.

The recording layer may contain any of various anti-fading agents for improving the light fastness of the recording layer.

A singlet oxygen quencher is generally used as the anti-fading agent. Any known singlet oxygen quencher as disclosed in publications such as patent specifications may be used.

Examples of such a quencher include those disclosed in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, 04-25492, Japanese Patent Application Publication (JP-B) Nos. 01-38680 and 06-26028, German Patent No. 350399, and Bulletin of the Chemical Society of Japan, October, 1992, page 1141.

The content of the anti-fading agent such as the singlet oxygen quencher in the chemical materials for recording is generally from 0.1 to 50% by mass, preferably from 0.5 to 45% by mass, more preferably from 3 to 40% by mass, and still more preferably from 5 to 25% by mass.

[Reflective Layer]

The reflective layer may be provided on the recording layer particularly for the purpose of improving the reflectivity at the time of information playback. The material for the reflective layer should exhibit high reflectivity to laser beams, and examples of such a material include metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi, and stainless steel. Preferable examples are Cr, Ni, Pt, Cu, Ag, Au, Al, and stainless steel. One of these materials may be used alone, or two or more thereof may be used in combination. Any alloy of any of these metals may also be used. Au, Ag or any alloy thereof is particularly preferred. For example, the reflective layer may be formed by vapor-depositing, sputtering or ion-plating the above light-reflecting material on the recording layer. The reflective layer preferably has a thickness of 10 to 800 nm, more preferably of 20 to 500 nm, and still more preferably of 50 to 300 nm.

[Adhesive Layer]

The adhesive layer may be placed between the reflective layer and the protective layer or the protective substrate.

The adhesive for forming the adhesive layer is preferably a UV ray-curable resin, and particularly preferably a UV ray-curable resin showing small cure shrinkage from the viewpoint of preventing warping of the disk. Examples of such a UV ray-curable resin include such UV ray-curable resins (UV-curable adhesives) as SD-640 (trade name) and SD-347 (trade name) manufactured by Dainippon Ink and Chemicals, Inc. In order to exhibit elasticity, the adhesive layer preferably has a thickness in the range of from 1 to 1000 μm, more preferably of from 5 to 500 μm, and particularly preferably of from 10 to 100 μm.

Other examples of the adhesive for forming the adhesive layer may include the below. The adhesive may be a radiation-curable resin having two or more radiation-sensitive double bonds in its molecule, and examples of such a material include acrylate esters, acrylamides, methacrylate esters, methacrylic acid amides, allyl compounds, vinyl ethers, and vinyl esters. Di- or more-functional acrylate or methacrylate compounds are preferred.

Specific examples of the applicable difunctional compounds include adducts produced by the addition of acrylic or methacrylic acid to an aliphatic diol, such as ethylene glycol diacrylate, propylene glycol diacrylate, butanediol diacrylate, hexanediol diacrylate, diethylene glycol diacrylate, triethylene glycol diacrylate, tetraethylene glycol diacrylate, neopentyl glycol diacrylate, tripropylene glycol diacrylate, ethylene glycol dimethacrylate, propylene glycol dimethacrylate, butanediol dimethacrylate, hexanediol dimethacrylate, diethylene glycol dimethacrylate, triethylene glycol dimethacrylate, tetraethylene glycol dimethacrylate, neopentyl glycol dimethacrylate, and tripropylene glycol dimethacrylate.

Also applicable is a polyether acrylate or a polyether methacrylate produced by the addition of acrylic or methacrylic acid to a polyether polyol such as polyethylene glycol, polypropylene glycol and polytetramethylene glycol; or a polyester acrylate or a polyester methacrylate produced by the addition of acrylic or methacrylic acid to a polyester polyol produced from any known dibasic acid and glycol.

Also applicable is a polyurethane acrylate or a polyurethane methacrylate produced by the addition of acrylic or methacrylic acid to a polyurethane that is produced by the reaction of any known polyol or diol and any known polyisocyanate.

Also applicable is an adduct produced by the addition of acrylic or methacrylic acid to bisphenol A, bisphenol F, hydrogenated bisphenol A, hydrogenated bisphenol F, or an alkylene oxide adduct thereof; isocyanuric acid and alkylene oxide-modified diacrylate; isocyanuric acid and alkylene oxide-modified dimethacrylate; or a compound having a cyclic structure such as tricyclodecane dimethanol diacrylate and tricyclodecane dimethanol dimethacrylate.

Examples of the applicable radiation include electron beam and UV radiation. When the UV radiation is used, a photopolymerization initiator should be added to the following compound. An aromatic ketone may be used as the photopolymerization initiator. Any aromatic ketone may be used, with which a mercury vapor lamp generally used as a UV radiation source can produce a bright line spectrum. The aromatic ketone preferably has a relatively high absorption coefficient at a wavelength of 254, 313, or 865 nm. Typical examples thereof include acetophenone, benzophenone, benzoin ethyl ether, benzyl methyl ketal, benzyl ethyl ketal, benzoin isobutyl ketone, hydroxydimethyl phenyl ketone, 1-hydroxycyclohexyl phenyl ketone, 2,2-diethoxyacetophenone, and Michler's ketone. Any of various aromatic ketones may be used. Based on 100 parts by mass of the compounds (a), the mixing ratio of the aromatic ketone may be from 0.5 to 20 parts by mass, preferably from 2 to 15 parts by mass, and more preferably from 3 to 10 parts by mass. A commercially available UV-curable adhesive previously containing the photopolymerization initiator may also be used. A mercury lamp or a metal halide lamp may be used as the UV light source. The lamp may be of 20 to 300 W/cm, and the radiation may be applied for 0.1 to 20 seconds. In general, the distance between the substrate and the lamp is preferably from 1 to 30 cm.

The electron beam accelerator may be a scanning type, a double scanning type or a curtain beam type. The curtain beam type is preferred, because it can produce high output power at relatively low cost. The characteristics of the electron beam include an accelerating voltage of 100 to 1000 kV, preferably of 150 to 300 kV and an absorbed dose of 0.5 to 20 Mrad, preferably of 1 to 10 Mrad. If the accelerating voltage is 10 kV or less, the amount of the transmitted energy can be insufficient. An accelerating voltage of more than 1000 kV can cause a reduction in the efficiency of the energy used for the polymerization and is not preferable from the viewpoint of cost.

[Protective Layer or Protective Substrate]

The protective layer or the protective substrate prevents penetration of water or blemishes. The material for forming the protective layer is preferably a UV ray-curable resin, a visible light-curable resin, a heat-curable resin, silicon dioxide, or the like. In particular, the UV ray-curable resin is preferred. For example, the UV ray-curable resin may be SD-640 (trade name) manufactured by Dainippon Ink and Chemicals, Inc. Alternatively, SD-347 (trade name) manufactured by Dainippon Ink and Chemicals, Inc., SD-694 (trade name) manufactured by Dainippon Ink and Chemicals, Inc., SKC D 1051 (trade name) manufactured by SKC Inc., or the like may be used. The protective layer preferably has a thickness in the range of from 1 to 200 μm, and more preferably of from 50 to 150 μm.

If the protective layer also serves as a path for the laser beam in the layered structure, it should have transparency. Herein, the wording "transparency" means that it is transparent in such a degree that the recording beam and the playback beam pass through it (at a transmittance of 90% or more).

The protective layer may be formed by spin coating. If the spin coating method is used, the protective layer can be formed without damage to the recording layer (such as dissolution of the dye and a chemical reaction of the dye with the material for the protective layer). In the spin coating process, the rotation speed is preferably from 50 to 8000 rpm, and more preferably from 100 to 5000 rpm, from the viewpoint of forming a uniform layer and preventing damage to the recording layer.

The process using the UV ray-curable resin for the protective layer may include the steps of forming the protective layer by spin coating and then curing the UV ray-curable resin by applying UV light from a UV-ray lamp (a metal halide lamp) to the protective layer.

Before the resin is cured, a process of allowing the resin to stand for a certain time period or the like may also be performed, in order to avoid unevenness in the thickness of the formed protective layer.

In the case of DVD-R, alternatively to the protective layer, a protective substrate (having a thickness of about 0.6 mm and made of the same material as the above substrate) may be stacked with an adhesive layer made of a UV ray-curable resin or the like.

Specifically, such a process includes the steps of forming a reflective layer, then discharging a UV ray-curable resin (such as SD640 (trade name) manufactured by Dainippon Ink and Chemicals, Inc.) onto the disk, placing thereon a protective substrate such as a polycarbonate substrate (with a thickness of 0.6 mm), spinning off some amount of the UV ray-curable resin at high rotation speed similarly to spin coating, and then curing the UV ray-curable resin by applying UV light to the substrate so that the substrates are bonded together. The adhesive layer may have a thickness of 20 to 60 μm.

<Optical Information Recording Method>

Information may be recorded on the optical information recording medium by the method of the invention as shown below. First, while an unrecorded optical information recording medium as described above is rotated at a predetermined linear velocity (of at least 14 m/s), a recording beam such as a laser beam is applied to the medium via an objective lens. When the beam is applied, the dye in the recording layer absorbs the beam to allow the temperature to rise locally, and thus the desired cavities (pits) are formed to change the optical characteristics so that the information is recorded.

In the process of forming one pit, the recording waveform of the laser beam may be a pulse string or a single pulse. The important thing is the ratio of the pulse(s) to the actual recording length (pit length).

The ratio of the laser beam pulse width to the actual recording length is preferably in the range of from 20 to 95%, more preferably of from 30 to 90%, and still more preferably of from 35 to 85%. In the case of the pulse string recording waveform, the sum thereof should be in the above range.

The laser beam power depends on the linear recording velocity. At a linear recording velocity of 14 m/s, the laser beam power is preferably in the range of from 15.0 to 20.0 mW, more preferably of from 16.5 to 19.5 mW, and still more preferably of from 17.0 to 19.0 mW. If the linear recording velocity is doubled, each preferred range of the laser beam power should be increased by $2^{1/2}$ times.

For high recording density, the NA of the objective lens used in the pickup is preferably 0.62 or more, and more preferably 0.65 or more.

In the invention, the recording beam may be a semiconductor laser beam having an oscillation wavelength in the range of from 300 to 700 nm.

In the invention, the linear recording velocity is at least 14 m/s (at a speed of 4×), preferably 21 m/s or more (at a speed of 6×), and more preferably 28 m/s or more (at a speed of 8×).

EXAMPLES

The present invention will be described in more detail in the following examples. However, the examples should not be construed to limit the scope of the invention.

Example 1

A polycarbonate resin was molded by injection molding into a substrate having a spiral groove (with a depth of 130 nm, a width of 300 nm and a track pitch of 0.74 μm), a thickness of 0.6 mm and a diameter of 120 mm. A coating liquid was prepared by dissolving 1.2 g of the following Dye A in 100 ml of 2,2,3,3-tetrafluoropentanol, wherein Dye A had an endothermic peak when subjected to the differential thermal analysis, which will be described below. The coating liquid was applied to the groove-side surface of the substrate by spin coating to form a recording layer. Silver was then sputtered on the recording layer to form a reflective layer with a thickness of about 150 nm. The substrate was then bonded to a dummy substrate using a UV ray-curable resin adhesive so that an optical disk (an optical information recording medium) was prepared.

The endothermic peak of Dye A had an intensity of 149 μVs/mg.

Dye A

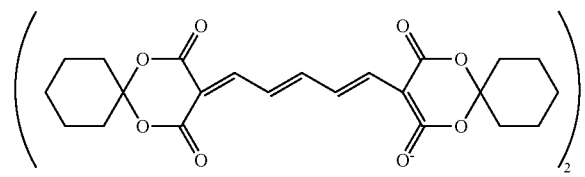

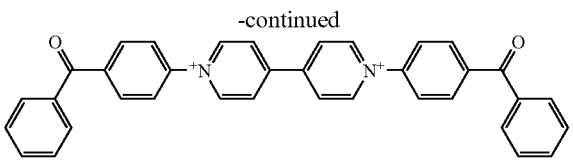

Comparative Example 1

An optical disk was prepared in the same manner as in Example 1, except that the following Dye B was used in place of Dye A. Dye B had no endothermic peak when subjected to the differential thermal analysis, which will be described below.

Dye B

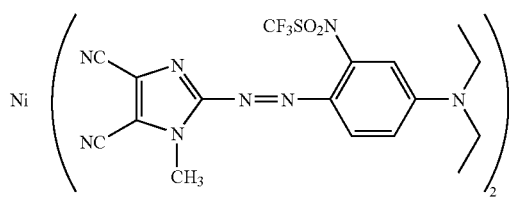

[Differential Thermal Analysis]

The measurement was performed using a TG/DTA apparatus manufactured by Seiko Instruments Inc. under the measurement conditions below.

Measurement environment: under a flow of nitrogen gas (at a flow rate of 200 ml/minute)

Reference: an aluminum container with no optical disk

Measurement temperatures: 30 to 550° C.

Rate of temperature rise: 10° C./minute

[Evaluation]

In a disk drive apparatus (trade name: DDU1000, manufactured by Pulstec Industrial Co., Ltd., with a laser wavelength of 635 nm and a numerical aperture of 0.6), 8-16 modulated signals were recorded at linear velocities varying from 3.5 to 28 m/s. The recording power was set in such a manner that the jitter was minimal in each optical disk. Playback was then performed using a laser beam having the same wavelength as for recording, and measurement was performed of optimal recording power, degree of modulation and LPP error rate after recording. The results are shown in Table 1.

TABLE 1

| | Exothermic Heat | | Endothermic Heat | | Linear Recording Velocity of 3.5 m/sec | | | Linear Recording Velocity of 28 m/sec | | |
|---|---|---|---|---|---|---|---|---|---|---|
| | Amount of Exothermic Heat (μV · s/mg) | Peak Temperature | Amount of Endothermic Heat (μV · s/mg) | Peak Temperature | Optimal Recording Power (mW) | Degree of Modulation | LPP Error Rate | Optimal Recording Power (mW) | Degree of Modulation | LPP Error Rate |
| Example 1 | 60 | 280 | 149 | 230 | 9 | 0.6 | 1.3 | 27 | 0.78 | 2 |
| Comparative Example 1 | 427 | 340 | none | — | 9 | 0.6 | 1.4 | 26 | 0.86 | 10 |

Table 1 indicates that while there is no significant difference between Example 1 and Comparative Example 1 at a linear recording velocity of 3.5 m/second, the LPP error rate in Example 1 is significantly lower than that in Comparative Example 1 at a linear recording velocity of 28 m/second.

According to the invention, there is provided the method for optically recording information in which LPP error rate can be low even when information is recorded at a linear velocity of at least 14 m/s.

What is claimed is:

1. An optical information recording method comprising recording information at a linear velocity of at least 14 m/s to an optical information recording medium comprising a substrate and a dye-containing recording layer formed on the substrate,
   wherein the dye has an endothermic peak and an exothermic peak when subjected to differential thermal analysis under a flow of nitrogen gas, and
   wherein the optical information recording medium has a pre-groove having a track pitch of 0.8 μm or less on the surface of the substrate.

2. The optical information recording method of claim 1, wherein the endothermic peak of the dye is 10 μVs/mg or more.

3. The optical information recording method of claim 2, wherein a minimum pit length of pits formed by recording is 0.5 μm or less.

4. The optical information recording method of claim 1, wherein, in the dye, a total amount of endothermic heat is larger than a total amount of exothermic heat.

5. The optical information recording method of claim 4, wherein a minimum pit length of pits formed by recording is 0.5 μm or less.

6. The optical information recording method of claim 1, wherein a minimum pit length of pits formed by recording is 0.5 μm or less.

7. The optical information recording method of claim 1, wherein the dye has an endothermic peak of 149 μVs/mg.

8. An optical information recording medium comprising a substrate and a dye-containing recording layer formed on the substrate having a track pitch of 0.8 μm or less,
   wherein the dye has an endothermic peak and an exothermic peak when subjected to differential thermal analysis under a flow of nitrogen gas, and the optical information recording medium is for being recorded with information at a linear velocity of at least 14 m/s.

9. The optical information recording medium of claim 8, wherein the endothermic peak of the dye is 10 μVs/mg or more.

10. The optical information recording medium of claim 8, wherein a total amount of endothermic heat is larger than a total amount of exothermic heat.

11. The optical information recording medium of claim 8, wherein a minimum pit length of pits formed by recording is 0.5 μm or less.

12. An optical information recording method comprising recording information at a linear velocity of at least 14 m/s to an optical information recording medium comprising a substrate and a dye-containing recording layer formed on the substrate, wherein the dye is represented by the following formula,

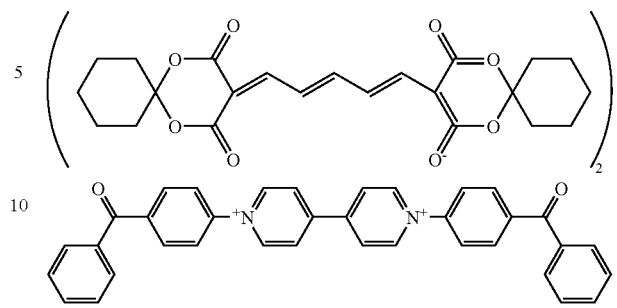

and wherein the dye has an endothermic peak when subjected to differential thermal analysis under a flow of nitrogen gas.

13. The optical information recording method of claim 12, wherein the optical information recording medium has a track pitch of 0.8 μm or less, and a minimum pit length of pits formed by recording is 0.5 μm or less.

14. An optical information recording medium comprising a substrate and a dye-containing recording layer formed on the substrate, wherein the dye has an endothermic peak when subjected to differential thermal analysis under a flow of nitrogen gas and is represented by the following formula,

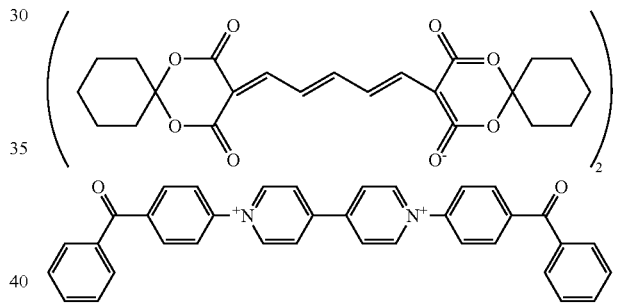

and wherein the optical information recording medium is recorded with information at a linear velocity of at least 14 m/s.

15. An optical information recording method comprising recording information by irradiating with a laser having a wavelength of 630 to 680 nm at a linear velocity of at least 14 m/s to an optical information recording medium,
   wherein the optical information recording medium comprises a substrate having on a surface thereof a pre-groove having a track pitch of 0.35 to 0.9 μm and a dye-containing recording layer formed on the substrate,
   wherein the dye has an endothermic peak and an exothermic peak when subjected to differential thermal analysis under a flow of nitrogen gas, and
   wherein a minimum pit length of pits formed by recording is 0.8 μm or less.

16. The optical information recording method of claim 15, wherein the pre-groove has a track pitch of 0.45 to 0.85 μm on the surface of the substrate.

17. The optical information recording method of claim 15, wherein the pre-groove has a track pitch of 0.50 to 0.80 μm on the surface of the substrate.

18. The optical information recording method of claim 15, wherein the linear velocity is 28 m/s or more.

19. The optical information recording method of claim 15, wherein in the dye, a total amount of endothermic heat is larger than an amount of exothermic heat.

20. The optical information recording method of claim 15, wherein the endothermic peak of the dye is 10 μVs/mg or more.

21. The optical information recording method of claim 15, wherein the optical information recording medium further comprises a reflective layer and a protective layer, in this order, on the recording layer.

* * * * *